(12) United States Patent
Kuhlmann et al.

(10) Patent No.: US 7,171,505 B2
(45) Date of Patent: Jan. 30, 2007

(54) UNIVERSAL NETWORK INTERFACE CONNECTION

(75) Inventors: Charles Edward Kuhlmann, Raleigh, NC (US); Francis Edward Noel, Jr., Durham, NC (US); Ann Marie Rincon, Burlington, VT (US); Rosemary Venema Slager, Cary, NC (US); Norman Clark Strole, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 10/137,167

(22) Filed: May 2, 2002

(65) Prior Publication Data

US 2003/0208652 A1 Nov. 6, 2003

(51) Int. Cl.
*G06F 13/14* (2006.01)

(52) U.S. Cl. ............... 710/305; 710/306; 710/100; 710/315; 709/224

(58) Field of Classification Search ............... 710/305, 710/100, 52, 4, 301–304, 306; 709/224
See application file for complete search history.

(56) References Cited

U.S. PATENT DOCUMENTS

| | | | |
|---|---|---|---|
| 5,539,666 A | 7/1996 | Kobayashi et al. ...... 364/514 R |
| 5,627,728 A | 5/1997 | Ma et al. ...................... 361/686 |
| 5,729,478 A | 3/1998 | Ma et al. .................... 361/708.1 |
| 5,984,731 A | 11/1999 | Laity ........................... 439/676 |
| 6,006,295 A | 12/1999 | Jones et al. .................... 710/62 |
| 6,067,628 A * | 5/2000 | Krithivas et al. ............ 713/340 |
| 6,070,199 A | 5/2000 | Axtman et al. ................. 710/1 |
| 6,072,803 A * | 6/2000 | Allmond et al. ............. 370/445 |
| 6,159,022 A | 12/2000 | Tsai ........................... 439/76.1 |
| 6,170,020 B1 * | 1/2001 | Blakeney et al. .............. 710/10 |
| 6,256,691 B1 * | 7/2001 | Moroz et al. ................ 710/303 |
| 6,324,608 B1 * | 11/2001 | Papa et al. ................... 710/104 |
| 6,356,942 B1 * | 3/2002 | Bengtsson et al. ........... 709/220 |
| 6,446,192 B1 * | 9/2002 | Narasimhan et al. ......... 712/29 |
| 6,601,124 B1 * | 7/2003 | Blair ........................... 710/305 |
| 6,748,525 B1 * | 6/2004 | Hubacher et al. ............... 713/1 |
| 6,938,118 B1 * | 8/2005 | Blixt et al. .................. 711/105 |
| 2002/0131365 A1 * | 9/2002 | Barker et al. ................ 370/235 |

(Continued)

OTHER PUBLICATIONS

IBM Research Disclosure, Jun. 1998, p. 764: "Dynamic Switching Between Different LAN Networking Media".

(Continued)

*Primary Examiner*—Rehana Perveen
*Assistant Examiner*—Kim T. Huynh
(74) *Attorney, Agent, or Firm*—Joscelyn G. Cockburn; James A. Lucas; Driggs, Hogg & Fry Co., LPA

(57) ABSTRACT

An interface connection is described for joining a host device, such as a Network Processor, to peripherals such as modems, printers, local area networks, Ethernets and Token-Ring interfaces. The connection is particularly useful for joining portable computers, such as laptops, to these peripherals. The connector utilizes a programmable Network Processor (NP) either in the host device or in an external fan-out box. This programmable Network Processor adapts the host device to a variety of peripheral devices utilizing different protocols and I/O speeds. The NP can use a Digital Signal Processor to provide programmable services to the physical layers. The host device may contain a high-speed communication interface with the NP contained in the external connection box.

15 Claims, 3 Drawing Sheets

U.S. PATENT DOCUMENTS

2002/0141337 A1* 10/2002 Grandin et al. ............. 370/229
2002/0146014 A1* 10/2002 Karlsson et al. ......... 370/395.6
2002/0165947 A1* 11/2002 Akerman et al. ........... 709/223
2003/0033406 A1*  2/2003 John et al. .................. 709/224
2003/0074478 A1*  4/2003 Ramirez ..................... 709/247
2003/0103490 A1*  6/2003 Noel et al. .................. 370/351
2003/0204634 A1* 10/2003 Pinkerton et al. ........... 709/250

OTHER PUBLICATIONS

Dossier RPS920000078, Jan. 8, 2001, "Widescreen Notebook Input/Output Device Interface".

* cited by examiner

UNIVERSAL NETWORK INTERFACE CONNECTION

BACKGROUND OF THE INVENTION

1. Field of the Invention

This invention relates to interface connections between electronic devices, such as personal computers and peripherals, that are used with the devices. More particularly, the invention relates to a universal physical interconnection interface including associated connector(s), interface technology and common software drivers.

2. Discussion of Related Art

The development of an ever-increasing number of physical interconnection interfaces for personal computers and networking equipment causes communication product developers tremendously difficult problems. Two examples will suffice to illustrate the point.

1. One of the most attractive attributes of a PC is its expandability to include modems, graphic accelerators, CD-ROM drives, scanners, video cameras, printers, disk drives and others. A defining element of the physical characteristics of a PC, such as a laptop computer, is the large number of connectors that are required to accommodate these internal and external devices. The numerous connectors require unique physical layer (generally analog) technology to interface with each connector and specific logic functions to interface with the analog technology. These logic functions are called the MAC (Media Access Control) layer functions.

2. For a manufacturer of communications equipment, generally there are a multitude of physical layer interfaces that must be supported. A particular product may require different interface versions to support 10/100 Mbps Ethernet, 16 Mbps Token-Ring, 1 Gbps Ethernet and 1 Gbps Fiber Channel, in addition to the numerous devices mentioned above. The problem, however, goes beyond the physical connectors to the MAC layer, where each interface requires its unique MAC layer support. Thus, in order for a universal connection scheme to work, it must be able to satisfy interoperability requirements with many physical layer communication standards and common I/O device standards.

Several related art patents and publications are summarized in the following discussion.

U.S. Pat. No. 5,539,666 Data Communications Method and System Coupling Device: This patent is relates to a data communication method and a system-coupling device. The data communication method preferably is used for serial communication wherein a bus of a computer system is coupled to a bus of an extension box or a bus of another computer system via a signal transmission path. A predetermined code system and data transfer scheme is defined that permits asynchronous interruption of a lower priority data transmission whenever a higher priority data transmission is required. Serial optical-fiber links are assumed to exist between the sending and receiving units.

U.S. Pat. No. 5,627,728 Expansion Box for Notebook Computers: This patent describes the physical design of an expansion box that physically mounts to the underside of a matching notebook computer. The expansion box contains the physical means for attaching modular expansion units (e.g., cartridges or cards). Each cartridge or card includes a connector for mating with a corresponding unit connector of the expansion board. The description of the preferred embodiment allows for the expansion box to reside separate from the notebook computer via a cable link rather than to be physically attached to the notebook computer. The patent does not address the functionality of the expansion units or the interface means that are incorporated within the expansion units, or between the expansion unit(s) and the system motherboard.

U.S. Pat. No. 5,729,478 Notebook Computer with Insertable Expansion Devices: This patent describes a design and method for attaching expansion units to a notebook computer. The design provides an "expansion notch" with connector to the system motherboard whereby the expansion unit(s) are designed to fit within the notch rather than protrude externally, thus minimizing the footprint of the overall unit when the expansion unit is installed. It does not address the functionality of the expansion units or the interface means that are incorporated within the expansion units, or between the expansion unit and the system motherboard.

U.S. Pat. No. 5,984,731 Removable I/O Device with Integrated Receptacles for Receiving Standard Plugs: This patent describes the physical design of a Type III PCMCIA adapter that contains a plurality of wired-network interface ports (RJ-type form factor). The electrical characteristics and physical form and dimensions are described.

U.S. Pat. No. 6,006,295 Translator with Selectable FIFO for Universal Hub Cables for Connecting a PC's PCMCIA or Parallel Ports to Various Peripherals Using IDE/ATAPI, SCSI, or General I/O: This patent is related to personal computers and, more particularly, to multi-use cables for connecting external devices to a personal computer. A universal cable set is described that includes a built-in translator device as part of the cable that allows the parallel port or PCMCIA adapter within a computer to attach to a plurality of devices, such as IDE/ATAPI, SCSI or other general I/O interfaces. It states that "A programmable means in the translator converts the parallel port signals into external interface signals for an integrated-device-electronics IDE interface, or into external interface signals for a small-computer-systems-interface." A software program executing in the PC transmits configuration information to the translator. The housing for the translator also contains a parallel printer port connector. A second cable of similar design contains a PCMCIA (Personal Computed Memory Card International Association) connector.

U.S. Pat. No. 6,070,199 Apparatus to Connect a Client Computer to a Computer Data Network: This patent describes a network interface device that utilizes an infrared link between a laptop computer and a wired-LAN interconnect unit. The communication software drivers within the computer provide a transparent link that appears as a direct-wired link to the computer applications. The interconnect unit contains the wired-LAN network interface card (NIC), such as a 10 Mbps Ethernet link. It also provides packet-filtering functions to forward only those packets that are destined for the computer via the infrared link.

U.S. Pat. No. 6,159,022 Universal Electrical Connector Station: This patent describes a specific mechanical and physical design for a universal electrical station, consisting of an enclosure, an electrical circuit board, and several external physical connections of multiple devices to a notebook computer. The design utilizes all four sides of the enclosure for physical connectors. This patent is associated with the physical design of a specific embodiment. It does not describe a specific design for an enclosure or circuit board, nor does it address software driver issues.

IBM 41082 Disclosure Publication, Dynamic Switching Between Different LAN Networking Media: This disclosure publication describes a universal software driver for interfacing a networking application to a plurality of physical media types (Ethernet, infrared, radio frequency, etc.). The basic concept is that a single, universal driver presents a common interface to the higher layer network applications while allowing the user to select the most convenient network interface link. The universal driver appears to be an Ethernet link to the network application, yet the actual transmission link may or may not be Ethernet.

IBM Dossier RPS920000078, Widescreen Notebook Input/Output Device Interface: This disclosure relates to an enhanced design of a laptop computer that includes an extended (e.g., wider) keyboard and display. The extended keyboard provides a recessed area and connector for incorporating pluggable enhancement modules or I/O devices. A plurality of devices are supported. The system is plug and play in that when an I/O device is plugged into the universal I/O connector, it may be automatically sensed by circuitry internal to the notebook computer and software drivers are loaded that enable the particular I/O device to be used.

BRIEF DESCRIPTION OF THE INVENTION

One object of the present invention is incorporating a programmable Network Processor (NP) into an external fan-out box to provide broader flexibility in adapting to a variety of device types.

Another object is the incorporation of a programmable Network Processor within a laptop computer to allow flexible attachment of multiple device types, either with or without an external fan-out box.

Still another object is the use of a programmable Network Processor device to handle the Media Access Control layer functions for a plurality of I/O types and speeds.

Yet another object is the extension of protocol support within a programmable Network Processor to MAC layer and layer 3 network protocols.

Further, it is an object to incorporate programmable digital signal processor elements within the programmable Network Processor to provide more flexibility in the physical interface attachments that can be currently supported.

These, as well as other objects and advantages, will become more readily understandable in light of the discussion that follows.

The present invention relates to a universal connection system that satisfies these interoperability requirements in a simple yet effective manner.

The invention relates to a computer system and its method of use wherein the system is composed of an electronic device and one or more peripherals associated with the device. A universal interface joins the device to each peripheral and uses a programmable Network Processor for handling the I/O between the device and each peripheral. The NP includes capabilities for handling multiple peripherals and a plurality of I/O speeds. It is incorporated into a fan-out box external to the electronic device or may be incorporated into the device itself, particularly where the device is a laptop computer. The NP may include support to MAC layer and layer 3 network protocols. The NP may also utilize or incorporate a programmable Digital Signal Processor. The system furthermore can support an Ethernet MAC format or any other suitable communications protocol for the flow of information between the electronic device and the peripherals. When the device is a laptop computer, it may include a high-speed communication interface with the NP contained in an external connection box.

The invention also relates to a universal interface connection for joining a plurality of peripherals to a portable computer. The connection includes a programmable Network Processor which may include the capabilities for handing a plurality of I/O speeds. The connection also includes a cable connecting the computer to the peripherals. A subsystem in the NP serves to translate I/O information into an output format to be sent by the cable for each peripheral. The NP either is incorporated into a fan-out box external to the electronic device or, if the electronic device is a laptop computer, may be included within the laptop computer. The NP may include support to layer 2 (MAC) protocols and layer 3 network protocols. The NP may also include a programmable digital signal processor.

For purposes of clarification, the following abbreviations when used hereinafter, will relate to the following components, systems or functions.

ATM means Asynchronous Transfer Mode.

DSP is a Digital Signal Processor. This is a high-speed coprocessor designed to do real-time manipulation of analog signals. It is described in a BDTI White Paper entitled THE EVOLUTION OF DSP PROCESSORS, by Jennifer Eyre and Jeff Bier, Berkeley Design Technology, Inc, 2000. Also, see www.bdti.com. or www.ti.com and go to DSP DEVELOPERS VILLAGE and look up "What is DSP".

Ethernet is a 10 Mbps or 100 Mbps baseband local area network (LAN) that allows multiple stations to access transmission medium at will without prior coordination. It is specified in the IEEE 802.3 Standards, the contents of which are incorporated herein by reference.

FCS is a Frame Check Sequence. This is a character or a field used for the detection of transmission errors.

GBEN Stands for Gigabit Ethernet

IP is Internet Protocol that is used to route data from its source to its destination in an internet environment.

LAN stands for Local Area Network comprising a computer network used to connect personal computers, workstations, printers and other peripherals within a limited geographical area, such as a single building or building complex.

MAC layer is a Media Access Control layer. For details of the design and operation, see Stallings, DATA AND COMPUTER COMMUNICATIONS, $2^{nd}$ Ed., page 10; or IEEE 802.3 and 802.5

PCMCIA stands for Personal Computer Memory Card International Association. It establishes standards including electrical and physical specifications for cards that are removably engaged with the sockets or slots of computers and peripherals.

PDU is a Protocol Data Unit, which is a unit of data specified in a protocol of a given layer. It consists of protocol control information and possibly user data from the next higher layer.

NP is a programmable Network Processor, the programming of which can be changed by the operator. A software program suitable in the teachings of the present invention can be written by any person skilled in the art. Except to the extent that the program interfaces with the other components and steps of providing a universal interface connection, it does not comprise a portion of the present invention.

Token-Ring is a network with a star topology that uses a procedure for passing tokens from one attaching device to another.

USB is Universal Serial Bus connector.

DETAILED DESCRIPTION OF THE INVENTION

This invention relates to the application of an NP that overcomes the problems associated with the expanding number of physical and logical interconnection interfaces.

The first problem of multiple connectors in a PC is addressed by defining a universal connector (which could be unique, or it may be one that is already used on the machine type in question). One embodiment requires, for each type of device to be supported, the development of a transition cable to provide the physical connector that a particular device normally connects to, such as in PCMCIA connector technology. Thus, an SCSI cable may be used to connect an SCSI disk drive to the PC; an IDE cable is used with an IDE hard drive; a printer cable for hooking up a printer, etc. Heretofore, the number of connectors required in the box has been somewhat reduced, thereby reducing the form factor of the product, a clear goal for laptop products, such as Think-Pad®. However, as previously noted, this requires that a number of transition cables be made available as options for the user. Behind the connector in the box lies the analog logic followed by an NP. The main thrust here is that the NP is programmed to support the necessary interfaces.

Figure 1:
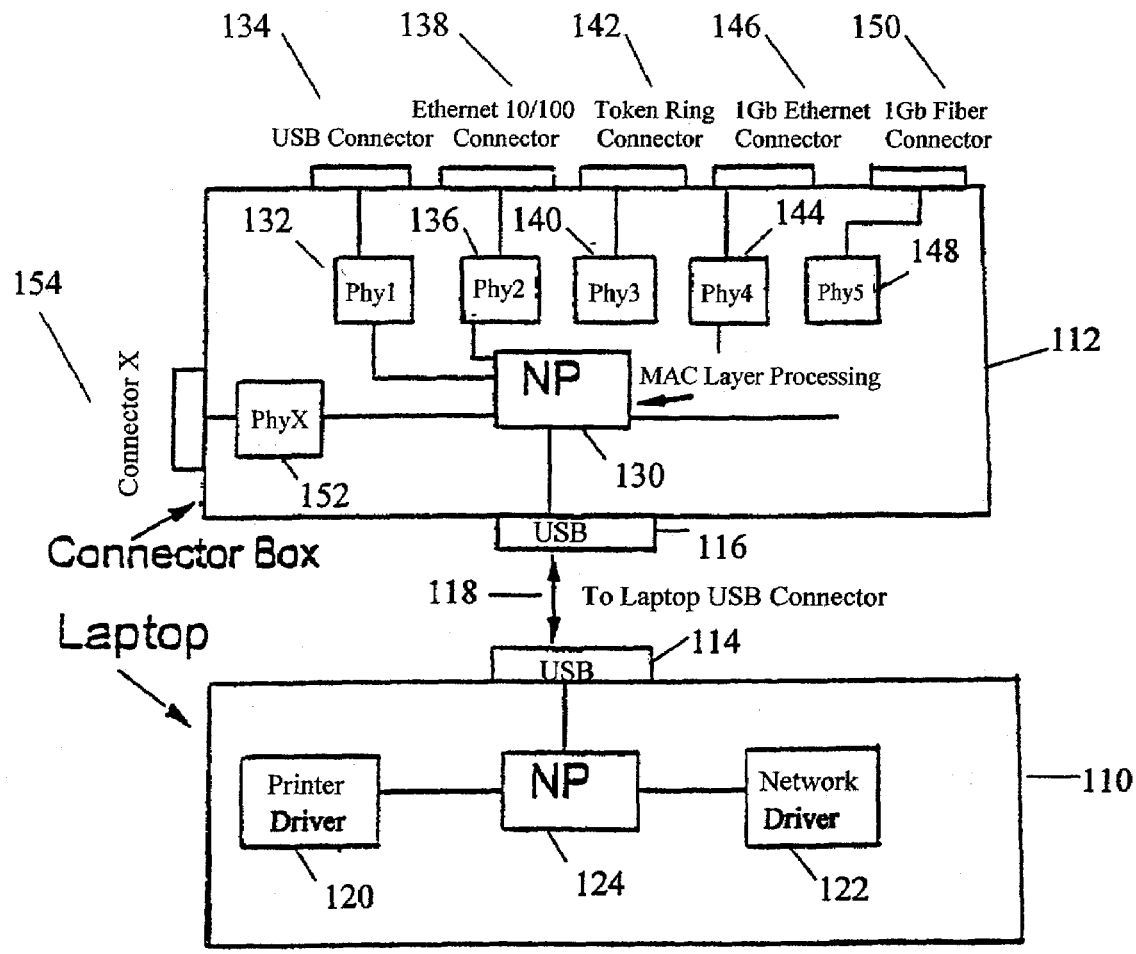
FIG. 1 is a block diagram showing one embodiment of the present invention.

Referring now to FIG. 1, a short cable joins a fan-out box to the universal connector in the laptop. This fan-out box houses an NP and handles the MAC (Media Access Control) layer functions for each of the product interfaces that are supported. It also multiplexes the traffic from the fan-out box, over the new interface, back to the laptop, where another NP demultiplexes the data and interfaces with the processor subsystem. In this configuration, if the user was mobile and did not need the many interfaces provided by the fan-out box, the single device can be attached via the universal interface in the laptop, and the NP inside the laptop then provides the MAC layer functions.

The drawing shows a laptop computer 110 and a connector box 112. A USB (universal serial bus) 114 on the laptop 110 is joined to a corresponding USB 116 on the connector box 112 by a suitable two way cable 118. Within the computer 110 is a logical interface delivering either printer packets 120 or network packets 122 to the Network Processor 124. The Network Processor is coupled to the laptop USB 114. The connector box 112 contains a Network Processor 130 which handles the MAC layer processing. Also included within the connector box 112 are a plurality of I/O physical interfaces joined to their matching connector ports. Phy1 132 is joined to USB connector port 134; Phy2 136 is joined to Ethernet 10/100 connector port 138; Phy3 140 is connected to Token-Ring connector port 142; Phy4 144 is connected to a 1 Gbps Ethernet connector port 146, Phy5 148 is joined to a 1 Gbps fiber connector port 150 and PhyX 152 is joined to connector port X 154. In the case of a manufacturer who has many different MAC layer interfaces to support, the NP can be used as a programmable MAC device. This arrangement serves to reduce the requirement to have, for example, 10/100 Mbps, 1 Gbps Ethernet, and 16 Mbps Token-Ring MAC layer devices in inventory. It also reduces the development time since board layout is simplified.

The programmable Network Processor implementation for attaching a variety of media types can also be extended to simplify the software drivers required in the host station. For example, Ethernet and Token-Ring have different frame formats and, thus, require unique software drivers to interface to higher-layer protocols. These drivers are responsible for building the full frame, including MAC-level headers, for outbound frames, as well as removing the MAC-level headers for inbound frames. The NP is capable of isolating the higher-layer software applications within the host from the MAC-level driver functions by providing the "intelligence" required to perform the basic driver functions. The NP-to-host internal interface can thus be a 'generic' interface for exchanging only the so-called Protocol Data Unit (PDU) minus the MAC-level headers. Thus, inbound traffic may reach the NP with Ethernet, Token-Ring or other MAC-level headers, which are stripped off prior to passing only the PDU information to the host. The NP also verifies the MAC-level frame to be error-free through the Frame Check Sequence (FCS) operation prior to removing the MAC header. Likewise, the MAC header and FCS information are appended to the basic PDU prior to transmission on either media type.

This functionality can also be extended to the Layer 3 Internet Protocol (IP) header processing. The IBM PowerNP® Network Processor, for example, can provide basic IP frame header manipulation for both inbound and outbound traffic. These functions may include:

Layer 3 Firewall function that filters traffic from reaching the host (based on IP header contents)
IP checksum validation (offloads host processing)
IP forwarding/rerouting (allow host to redirect traffic if necessary)

Figure 2:
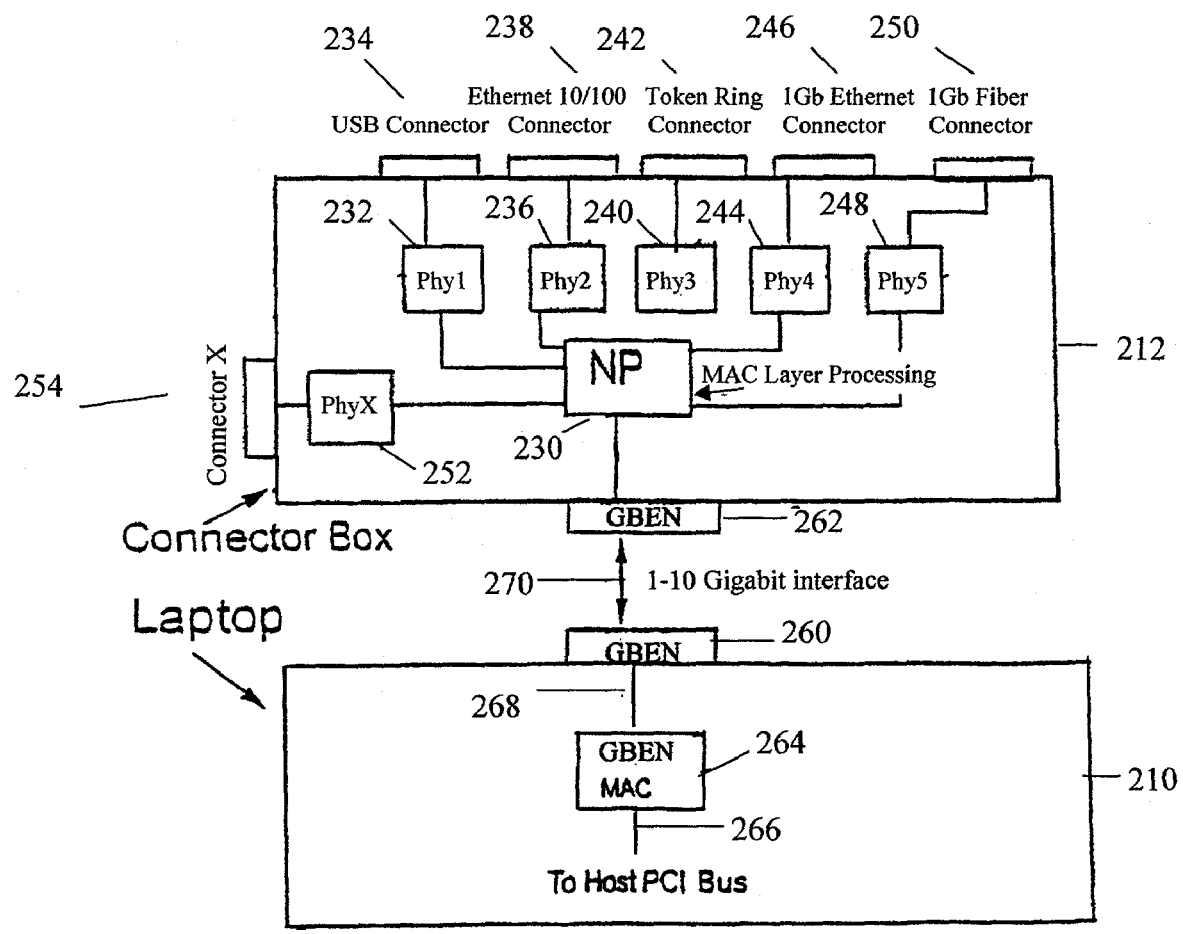
FIG. 2 is a block diagram of another embodiment.

A second aspect of the invention, as illustrated in FIG. 2, addresses an alternative approach whereby a single, high-speed communications interface is used in the host (e.g. a laptop computer) to send and receive all I/O traffic addressed to external devices and/or network connections. For simplification, the last two digits of the reference numbers refer to similar components in the drawings. The drawing shows a laptop computer 210 and a connector box 212. Within the computer 210 is a printer packet GBEN MAC 264 with a line 266 leading to a host PCI bus. The GBEN MAC 264 is joined to GBEN 260 that communicates through a high-speed interface 270 with GBEN 262 on the connector box 212. As in FIG. 1, the connector box 212 contains a Network Processor 230 which handles the MAC layer processor. Included within the connector box 212 are a plurality of physical layers joined to their matching connector ports. Phy1 232 is joined to USB connector port 234; Phy2 226 is joined to Ethernet 10/100 connector port 238; Phy3 240 is connected to Token-Ring connector port 242; Phy4 244 is connected to a 1 Gbps Ethernet connector port 246; Phy5 248 is joined to a 1 Gbps fiber connector port 250, and PhyX 252 is joined to connector X port 254. In this case, the software in the host system communicates with all external devices using layer 2 headers and packetized data. The Network Processor 230 in the Connector Box converts packets sent from the host into the appropriate MAC format for the target I/O device and routes the data to the appropriate connector port. A Digital Signal Processor inside the NP also formats the raw data into an appropriate bit stream to match the physical layer signaling requirements of the standard device interface, i.e. parallel, serial, USB, Ethernet, Token-Ring, etc. This embodiment provides the advantages of a single software interface and a single, standard, high-speed communications interface.

The application of the programmable Network Processor to provide a MAC interface for communications ports with different physical interfaces, i.e. Ethernet and Token-Ring, can be extended to many other I/O ports. There are several benefits to this approach, one of which is that a single software interface or hardware abstraction layer can be defined to cover data movement and control between the host and all I/O ports in the system. More details concerning hardware abstraction layers can be found at http://msdn.microsoft.com.

The I/O ports used as examples in this invention, e.g. Token-Ring, Ethernet, xDSL, FDDI, ATM, USB, Modem, Legacy Serial and Legacy Parallel, each have different data formatting requirements at the MAC layer and different signaling requirements at the physical interface between the host and the specific I/O connection. The architecture of a Network Processor allows co-processing attachments to enhance processing speed and function. One or more Digital Signal Processors are added, either embedded or attached through an external co-processing bus, to the core of the Network Processor and are used to provide programmable physical layer services. One such service is the Fast Link Pulse signaling used for Auto-Negotiation between Ethernet Phy devices. The signaling convention defined by this standard allows different speed Ethernet devices, i.e. 10 Mbps and 100 Mbps, to attach to the same physical port. Provided that there is some signaling convention defined to allow the host interface to detect the attachment and characteristics of the I/O device, then the NP with DSP can automatically configure itself to communicate with that device.

More than one DSP or a multi-ported DSP can be added to handle concurrent operations to multiple I/O ports. Other signaling services can be programmed into the DSP as they become standardized, including Plug'n Play, allowing OEM companies to support new I/O interfaces as soon as they are defined by the industry, independent of application specific hardware activity.

Figure 3:
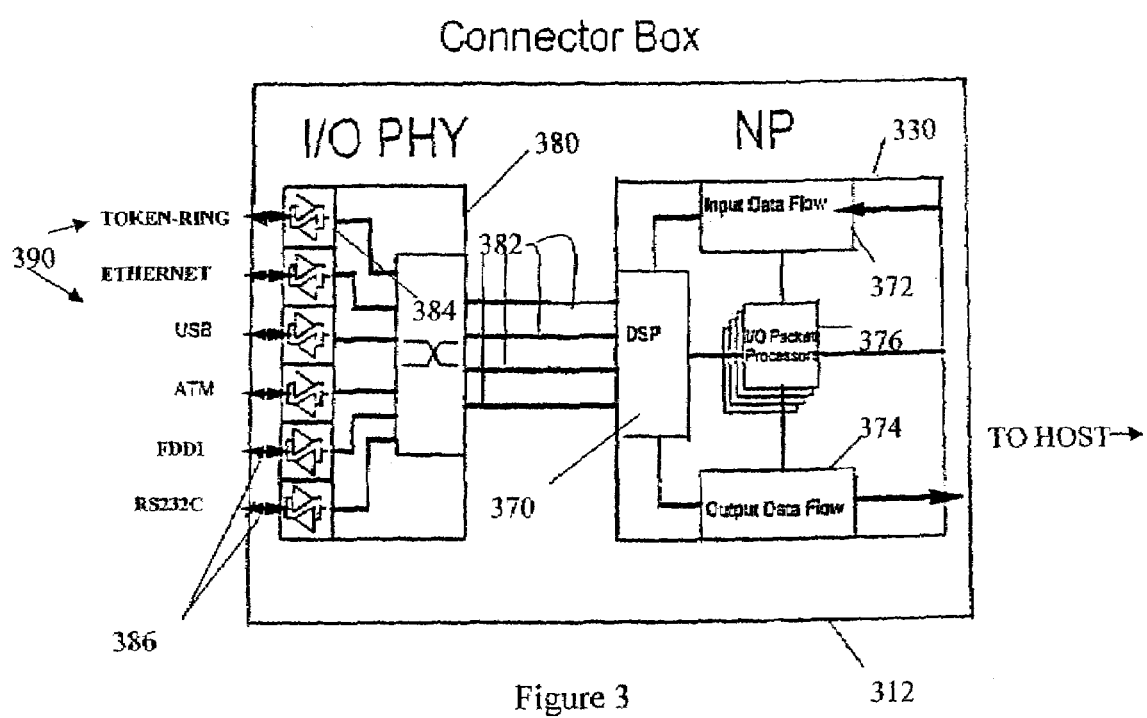
FIG. 3 shows logic and circuit elements of the Network Processor useful in the teachings of the present invention.

FIG. 3 shows the connector box 312 with high level view of a programmable Network Processor 330, as well as the circuit elements required to connect a DSP interface 370 to a specific I/O port and to provide the correct transceiver signal characteristics, i.e. power and voltage transitions. Shown within the Network Processor 330 are an input data flow 372, an output data flow 374 and a plurality of I/O packet processors 376. The Network Processor 330 is connected to the I/O physical interface 380 through a plurality of wires 382. The interface 380 in joined through gates 384 and a plurality of connectors 386 to a plurality of devices 390 which, for purposes of illustration, are a Token-Ring, Ethernet, USB, ATM, FDDI, and RS232C serial interface ports.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A computer system comprising an electronic device and a plurality of peripherals associated with said electronic device and having differing I/O speeds and formats, a universal interface joining said electronic device to each peripheral and having a programmable Network Processor (NP) with at least one digital signal processor for concurrently handling the I/O between said electronic device and each peripheral at a plurality of I/O speeds, the NP further including a Media Access Control (MAC) function for each physical interface, said MAC function including a plurality of I/O protocols for matching the I/O format of each peripheral with that of the computer.

2. The computer system according to claim 1 wherein the NP is incorporated into a fan-out box external to the electronic device.

3. The computer system according to claim 1 wherein the electronic device is a laptop computer.

4. The computer system according to claim 3 wherein the NP is included within the laptop computer.

5. The computer system according to claim 3 wherein the laptop computer includes a high-speed communication interface and the NP is included in an external connection box.

6. The computer system according to claim 5 wherein the digital signal processor serves to format data into bit streams to match physical layer signaling requirements of the communication interfaces.

7. The computer system according to claim 1 wherein the NP includes support to layer 2 link protocols and to layer 3 network protocols.

8. The computer system according to claim 1 further including an Ethernet packet format for the flow of information between the electronic device and said one or more peripherals.

9. A method for concurrently establishing information links between a computer and a plurality of external units, comprising:
   a. Using a programmable Network Processor (NP) subsystem having at least one digital signal processor to translate information into an I/O format for use by external units, said subsystem including a Media Access Control function having a plurality of I/O protocols for matching the I/O format of each peripheral with that of the computer;
   b. Providing the subsystem with an I/O physical interface for each external unit; and
   c. Connecting each external unit to the computer by an I/O physical interface of the subsystem.

10. The method according to claim 9 wherein the computer is a portable device.

11. The method according to claim 10 wherein the portable device is a laptop computer.

12. A universal interface connection for joining a plurality of peripherals to a portable computer, comprising:
   a. a programmable Network Processor (NP) including a programmable digital signal processor, wherein the NP has the capability for handing a plurality of I/O speeds, and includes support to layer 2 link protocols and layer 3 network protocols;
   b. a cable connecting the computer by an I/O physical interface to the peripherals; and
   c. the digital signal processor subsystem in the NP capable of concurrently translating I/O information into an output format to be sent by the cable for each peripheral.

13. The universal interface connection according to claim 12 wherein the NP is incorporated into a fan-out box external to the electronic device.

14. The universal interface connection according to claim 12 wherein the portable computer is a laptop computer.

15. The universal interface connection according to claim 14 wherein the NP is included within the laptop computer.

* * * * *